Figure 1:
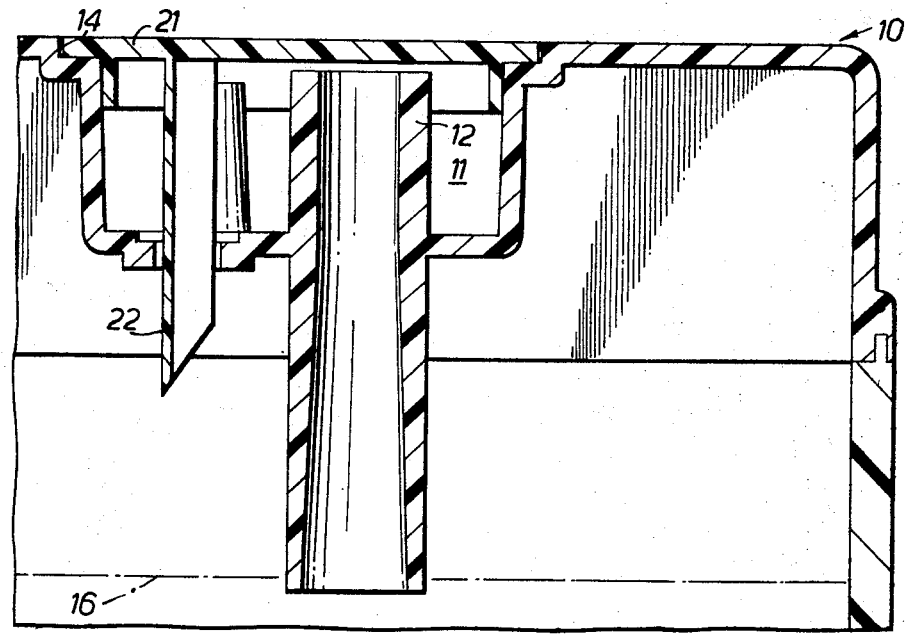

United States Patent [19]
Painter et al.

[11] 3,708,348
[45] Jan. 2, 1973

[54] TOPPING-UP ARRANGEMENTS FOR MULTI-CELL ELECTRIC BATTERIES

[75] Inventors: Roy Painter, Smallshaw, Ashton-under-Lyne; Graham John Vaughan, Swinton, near Manchester, both of England

[73] Assignee: Electric Power Storage Limited, Manchester, England

[22] Filed: Aug. 21, 1970

[21] Appl. No.: 65,970

[52] U.S. Cl. ................136/170, 136/178, 136/182
[51] Int. Cl. ..............................................H01m 1/02
[58] Field of Search.......136/162, 170, 177, 178, 182

[56] References Cited

UNITED STATES PATENTS 2,306,569  12/1942  Sandusky..............................136/178
3,485,678  12/1969  Blaich et al..........................136/170

FOREIGN PATENTS OR APPLICATIONS 635,716  1/1962  Canada..................................136/178

Primary Examiner—Donald L. Walton
Attorney—Watson, Cole, Grindle & Watson

[57] ABSTRACT

A topping-up arrangement for multi-cell electric storage battery comprises a vent extending down into each cell to a point below the desired liquid level, and a small filling opening into each cell from a common filling trough, of such size that a meniscus will form. A removable common cover for the trough carries a number of probes, one projecting down through each filling opening the probe being so shaped as to permit air to escape while liquid drains into the cell.

13 Claims, 8 Drawing Figures

PATENTED JAN 2 1973 3,708,348

SHEET 2 OF 2

INVENTORS
ROY PAINTER
GRAHAM JOHN VAUGHAN
BY
Watson, Cole, Grindle & Watson
ATTORNEY

TOPPING-UP ARRANGEMENTS FOR MULTI-CELL ELECTRIC BATTERIES

This invention relates to topping-up arrangements for multi-cell electric storage batteries and is concerned with the provision of a simple arrangement for facilitating one-shot topping-up of a number of cells.

According to the present invention the arrangement includes a vent for each cell open to atmospheric pressure and extending down into the cell to slightly below the desired level of the electrolyte, a trough common to a number of cells and extending over the top of them, a filling opening from the trough into each cell, of such size that a meniscus will form across the hole preventing air from escaping through it while liquid is entering through it, and a probe adapted to extend through each opening and shaped so as to permit air to escape while the liquid drains through the opening. The probe is preferably of such section as to partially enclose a volume of fluid and may comprise a pair of opposed walls. Thus a probe which is of a section having in it one or more grooves may be employed, for example a 'Y', 'T' or cruciform section or a 'C' or 'U' section.

The diameter of the opening may be between 4 mm and 8 mm but preferably between 6 mm and 7.5 mm. It is desirable that the probe is of sufficient length to extend at least 10 mm below the bottom of the opening and that the size of the probe in relation to the opening is such as to leave a clearance between them. The clearance being not less than 1.16 mm in the case of a 'C' or 'U' section. The lower end of the probe may be pointed.

Preferably, the probes for all or a number of cells are carried by a cover for covering the trough serving those cells.

Figure 2:
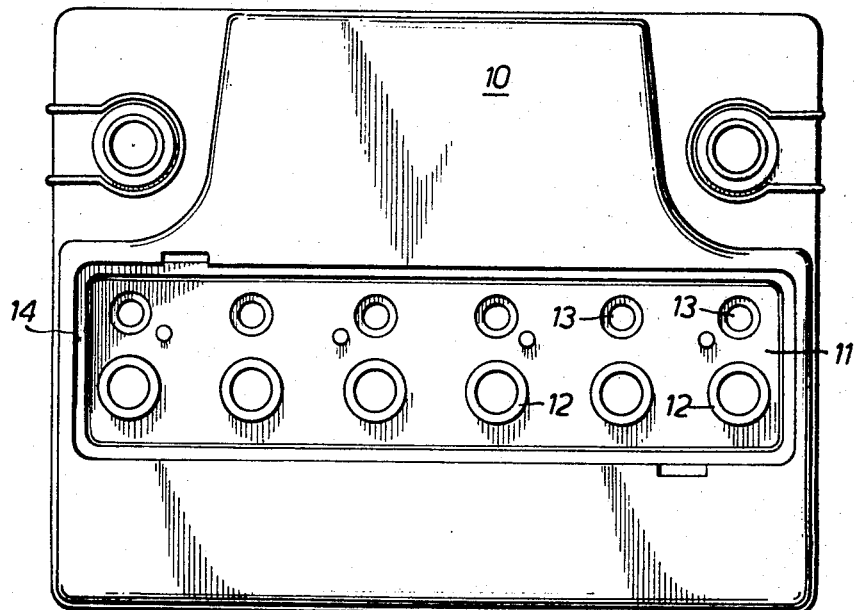
Figure 3:
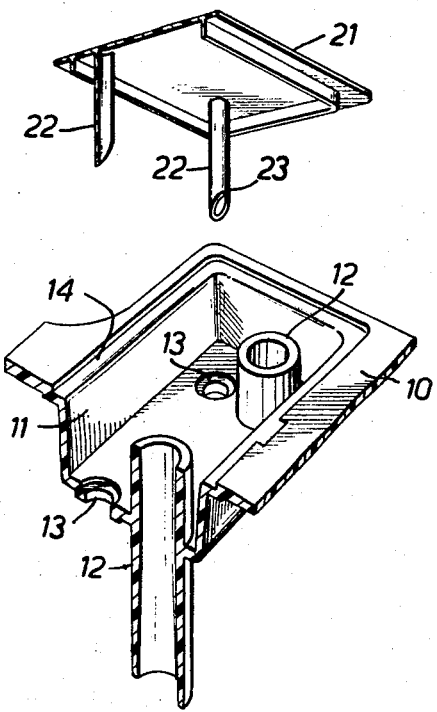

Further features and details of the invention will be apparent from the following description of one specific embodiment and modifications that will be given by way of example with reference to the accompanying drawings in which:

FIG. 1 is a sectional elevation of part of a battery lid and cover showing the topping-up arrangement, FIG. 2 is a plan view of a battery lid with the cover removed, FIG. 3 is a perspective view of part of the lid and cover shown in FIG. 1, and FIGS. 4 to 8 are cross-sectional views of probes having 'C', 'U', 'T', 'Y', and cruciform sections respectively.

In the embodiment the invention is applied to a motor-car starting battery, having, for example, six cells. The battery has a monobloc lid 10 formed with a trough 11 extending over all the cells for topping-up. Projecting up from the bottom of the trough 11 are a row of venting tubes 12 each of which extends down into one of the cells to slightly below the desired level of electrolyte. The desired level is indicated by the chain line 16 in FIG. 1.

Alongside each venting tube 12 is a filling opening 13 of such size that a meniscus can form to prevent air escaping through it while liquid is entering the cell through it from the trough 11. Typically an opening of 6.35 mm diameter is found suitable.

The trough 11 is provided with a flat cover 21 which fits nearly flush with the surrounding surface of the lid 10 and is located by a recess 14 in the lid/or alternatively by two or more projections (not shown) which fit into certain of the venting tubes. The cover 21 carries a row of six probes or quills 22 each projecting down and extending through one of the filling openings 13 when the cover is placed in position. Each probe 22 is of tubular form (of outside diameter 5.1 mm) having a single longitudinal slit 23 extending throughout its length so as to produce a probe of 'C' or 'U' section (shown in FIGS. 4 and 5 respectively), and, when in position, it extends down to a point about 11 mm below the underside of the trough, electrolyte.

Accordingly, the operation is as follows: In order to top-up the battery the cover 21 is removed and water is poured into the trough 11. The water flows down through the filling openings 13 while air escapes through the venting tubes 12. As the level in each cell approaches the desired level 16, the underside of the venting tube 12 is closed by the liquid so that air can no longer escape through it. As already indicated the size of the filling opening is such that a meniscus can form across it preventing air from escaping through it while liquid is entering through it, so that an air lock is formed and no further liquid enters the cell. After all the cells have reached this condition, water begins to rise in the trough 11, and the user stops pouring, for example when the water level in the trough reaches an appropriate mark. This leaves a small quantity of liquid in the trough. The user then puts the cover 21 on the trough and when the probes 22 enter the filling openings, it is found that they break the meniscus in each opening and allow the liquid remaining in the trough to drain into the cells.

The size of each filling opening and the shape of the probe are such that the liquid drains into the cells as soon as the cover carrying the probes is placed in position, although in some cases it may be sufficient if, with the cover in place, the liquid drains from the trough as soon as the complete battery is vibrated, for example due to movement of a vehicle in which the battery is installed. It is important that the liquid should drain in use since on the one hand pure water remaining in the trough is liable to freeze in cold weather, and in addition if gassing occurs the electrolyte may be forced up through the vent tubes and may find its way out from under the cover. In addition if the battery was topped up in extremely low temperature conditions, and remained for a long period in a stationary vehicle, the layer of pure water on top of the electrolyte could freeze and seal both the filling opening and the vent opening of each cell.

To ensure satisfactory draining, each filling opening should not be too big, say more than about 8 mm diameter, to ensure that the liquid will not drain through it before the probe is inserted, resulting in over-filling. Conversely if the opening is too small, say less than 4 mm diameter, filling may be rather slow and there may be difficulty in getting a probe to give reliable draining.

Figure 4:
Figure 5:
Figure 6:
Figure 7:
Figure 8:

The section of the probe also has an influence on draining, and in general it is thought that it should be such as to partially enclose a volume of liquid, for example between a pair of opposed walls or in a groove. Thus a pair of parallel strips has been found to function, as have probes of cruciform, 'T' or 'Y' section (shown in FIGS. 8, 6 and 7 respectively) and the probes shown in FIGS. 1 and 3 which as referred to above and shown in FIGS. 4 and 5 are of 'C' or 'U' section.

It appears important that the size of the probe in relation to the opening should be such as to leave a clearance round it, for example at least a 1 mm. It is also important that the probe should extend beyond the bottom of the filling opening to an appreciable distance, say not less than 10 mm while the open groove extends above the liquid surface. As described above the end of the probe may be pointed.

A solid rod or a tube has not been found to achieve draining and other shapes have given unreliable results.

The invention is not dependent on any particular theory of operation, and indeed it is observed that sometimes a bubble of air travels up the inside of the probe (the liquid presumably descending outside it) and sometimes vice versa. It is believed that, at least on some occasions, it is a requirement that the probe should divide the surface of the liquid into two areas which do not merge to such an extent that one cannot descent without dragging the other with it by surface tension, and hence one can descend without the other, the descending liquid column being replenished until it exerts an appreciable head to overcome surface tension and force a bubble of liquid up the other column.

What we claim as our invention and desire to secure by Letters Patent is:

1. A storage battery having means for topping-up the electrolyte to a desired level, comprising:
   a number of cells housed within said storage battery;
   a lid for covering said storage battery and including a vent for each cell open to atmospheric pressure and extending down into the cell to slightly below the desired level of the electrolyte;
   said lid further including a trough for receiving liquid and extending over the top of said cells;
   a filling opening extending through said trough into each cell and having a diameter so that a meniscus will form across said opening with liquid in said trough preventing air from escaping from said opening; and
   a cover for covering said trough and including a probe extending through each said opening and having one or more grooves to permit air to escape as the liquid in said trough drains through said opening with said cover on said lid.

2. A storage battery as in claim 1 in which said probe comprises a pair of opposed walls for enclosing a volume of liquid therebetween.

3. A storage battery as in claim 1 in which the diameter of each said opening is between 4 mm and 8 mm.

4. A storage battery as in claim 3 in which the diameter of said opening is between 6 mm and 7.5 mm.

5. A storage battery as in claim 1 in which said probe is of sufficient length to extend at least 10 mm below the bottom of said opening.

6. A storage battery as in claim 1 in which the size of said probe relative to said opening is such as to leave a clearance therebetween.

7. A storage battery as in claim 6 in which said clearance is not less than 1.16 mm.

8. A storage battery as in claim 1 in which the lower end of said probe is pointed.

9. A storage battery as in claim 1 wherein said probe has a "Y" cross-section.

10. A storage battery as in claim 1 wherein said probe has a "T" cross-section.

11. A storage battery as in claim 1 wherein said probe has a "U" cross-section.

12. A storage battery as in claim 1 wherein said probe has a "C" cross-section.

13. A storage battery as in claim 1 wherein said probe has a cruciform cross-section.

* * * * *

UNITED STATES PATENT OFFICE
CERTIFICATE OF CORRECTION

Patent No. 3,708,348    Dated January 2, 1973

Inventor(s) Roy Painter and Graham John Vaughan

It is certified that error appears in the above-identified patent and that said Letters Patent are hereby corrected as shown below:

Foreign Application Priority Data

August 21, 1969  Great Britain  No. 41834/69

Signed and sealed this 10th day of July 1973.

(SEAL)
Attest:

EDWARD M. FLETCHER, JR.
Attesting Officer

Rene Tegtmeyer
Acting Commissioner of Patents